(12) United States Patent
Kantipudi et al.

(10) Patent No.: US 10,394,981 B1
(45) Date of Patent: Aug. 27, 2019

(54) TECHNIQUES FOR TESTING PROGRAMMABLE INTERCONNECT RESOURCES

(71) Applicant: Altera Corporation, San Jose, CA (US)

(72) Inventors: Kalyana Kantipudi, San Jose, CA (US); Neil Da Cunha, San Jose, CA (US)

(73) Assignee: Altera Corporation, San Jose, CA (US)

( * ) Notice: Subject to any disclaimer, the term of this patent is extended or adjusted under 35 U.S.C. 154(b) by 714 days.

(21) Appl. No.: 15/135,113

(22) Filed: Apr. 21, 2016

(51) Int. Cl.
*G06F 17/50* (2006.01)

(52) U.S. Cl.
CPC .................. *G06F 17/5027* (2013.01)

(58) Field of Classification Search
CPC .................................................. G06F 17/5027
USPC ......................................................... 716/106
See application file for complete search history.

(56) References Cited

U.S. PATENT DOCUMENTS

| | | | | |
|---|---|---|---|---|
| 6,470,485 B1 * | 10/2002 | Cote | ................ | G01R 31/31851 324/613 |
| 6,874,110 B1 * | 3/2005 | Camarota | ........ | G01R 31/31851 714/733 |
| 6,966,020 B1 * | 11/2005 | Abramovici | ..... | G01R 31/31851 714/725 |
| 7,124,338 B1 * | 10/2006 | Mark | ................ | G01R 31/31717 714/725 |
| 7,409,669 B1 | 8/2008 | Dastidar et al. | | |
| 7,603,599 B1 * | 10/2009 | Cossoul | .............. | G06F 17/5077 326/38 |

* cited by examiner

*Primary Examiner* — Jack Chiang
*Assistant Examiner* — Brandon Bowers
(74) *Attorney, Agent, or Firm* — Steven J. Cahill

(57) ABSTRACT

A programmable integrated circuit includes rows of circuit blocks and up and down driving vertical interconnect resources. Each of the up and down driving vertical interconnect resources comprises a programmable signal path coupled to at least two of the rows of circuit blocks. A defect in any one of the up driving vertical interconnect resources in the programmable integrated circuit causes circuit blocks in a different set of the rows to store incorrect values compared to defects in the up driving vertical interconnect resources that originate in different ones of the rows of circuit blocks. A defect in any one of the down driving vertical interconnect resources in the programmable integrated circuit causes circuit blocks in a different set of the rows to store incorrect values compared to defects in the down driving vertical interconnect resources that originate in different ones of the rows of circuit blocks.

8 Claims, 6 Drawing Sheets

TECHNIQUES FOR TESTING PROGRAMMABLE INTERCONNECT RESOURCES

FIELD OF THE DISCLOSURE

The present disclosure relates to electronic circuits, and more particularly, to techniques for testing programmable interconnect resources.

BACKGROUND

Programmable integrated circuits (ICs), such as field programmable gate arrays (FPGAs), typically include rows and columns of programmable logic circuits and programmable interconnect resources. Each programmable logic circuit may include one or more registers and one or more lookup table (LUT) circuits. A programmable IC may also include other types of circuits interspersed between the programmable logic circuits, such as digital signal processing (DSP) circuits and memory circuits. The programmable logic circuits and the programmable interconnect resources are configured by configuration bits to implement a user design.

A programmable integrated circuit (IC) is tested after manufacturing to screen for any defects. When a defect is detected on a programmable IC, a failed row of programmable logic circuits is replaced with an extra redundant row of programmable logic circuits. A test algorithm for repairing failing resources in a programmable IC may involve reading out values stored in registers in the IC and identifying any failing row by performing a per test configuration mapping table lookup to compare the values stored in the registers to expected values.

BRIEF SUMMARY

According to some embodiments, a programmable integrated circuit includes rows of circuit blocks, up driving vertical interconnect resources, and down driving vertical interconnect resources. Each of the up driving vertical interconnect resources comprises a programmable signal path coupled to at least two of the rows of circuit blocks. A defect in any one of the up driving vertical interconnect resources in the programmable integrated circuit causes circuit blocks in a different set of the rows to store incorrect values compared to defects in the up driving vertical interconnect resources that originate in different ones of the rows of circuit blocks. Each of the down driving vertical interconnect resources comprises a programmable signal path coupled to at least two of the rows of circuit blocks. A defect in any one of the down driving vertical interconnect resources in the programmable integrated circuit causes circuit blocks in a different set of the rows to store incorrect values compared to defects in the down driving vertical interconnect resources that originate in different ones of the rows of circuit blocks.

Various objects, features, and advantages of the present invention will become apparent upon consideration of the following detailed description and the accompanying drawings.

DETAILED DESCRIPTION

Figure 1:
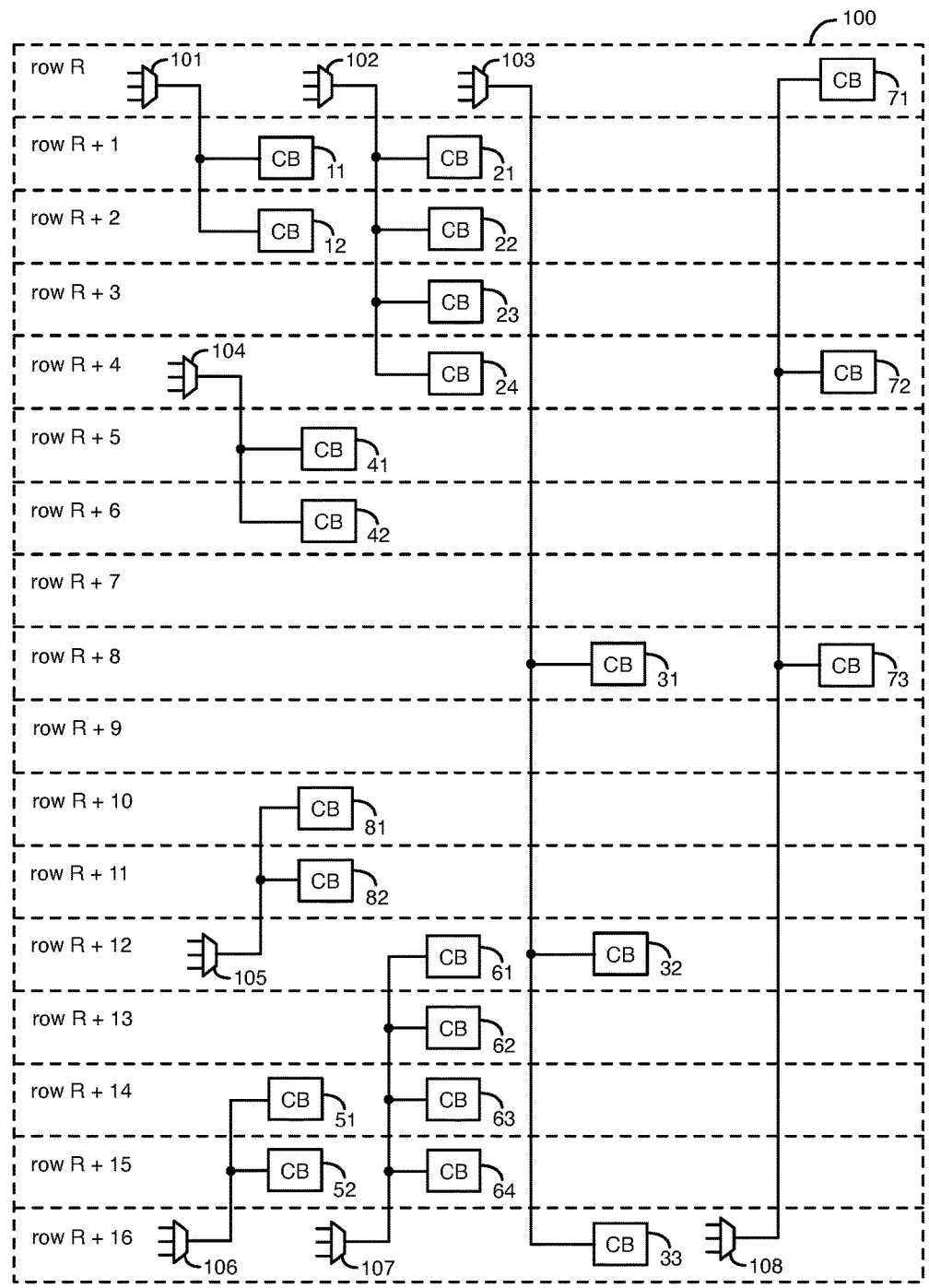
FIG. 1 illustrates vertical interconnect resources that have deterministic horizontal fanouts in a portion of a programmable integrated circuit (IC), according to an embodiment.

A programmable integrated circuit (IC) typically includes programmable interconnect resources that interconnect circuit blocks in the IC. The programmable interconnect resources include vertical interconnect resources and horizontal interconnect resources (also referred to as vertical and horizontal routing resources). Each of the vertical interconnect resources routes a signal between rows of circuit blocks in the IC. Each of the horizontal interconnect resources routes a signal within a single row of circuit blocks. A horizontal interconnect resource has interconnect circuits that create at least one routed path within the same row of circuit blocks. The circuit blocks may be, for example, programmable logic circuits, DSP circuits, and/or memory circuits.

During the production test phase of a programmable IC, the programmable interconnect resources in the IC are tested using test vectors. Various circuit blocks are coupled together in test routes in a test configuration. Each test route connects a source register to sink registers in one or more rows of circuit blocks via a programmable interconnect resource. The source and sink registers are in circuit blocks in the programmable IC.

The test vectors are shifted into the source registers while the source registers are configured as scan chain registers. The test vectors are then driven through the test routes from the source registers to the sink registers via the programmable interconnect resources. The output values for the test routes are then shifted out of the sink registers while the sink registers are configured as scan chain registers. The output values are then compared to expected values to determine if there are defects in the test routes between the source registers and the sink registers. If the results of the test indicate that any of the rows of circuit blocks has a failure, the failing row is replaced with a redundant row.

According to one previously known test constraint for testing vertical resources disclosed in U.S. Pat. No. 7,409,669, test routes from a particular vertical resource are required to connect resources in two different rows in order to test the vertical resources. If only one of the sink registers generates a failure, the row containing the sink register is replaced. If both of the sink registers fail, the source register's row is replaced. One problem with this constraint is that if a first vertical interconnect resource originating in a first row routes a test signal through a second vertical interconnect resource originating in a second row to third and fourth destination rows, and the sink registers in the destination rows capture incorrect values, it may not be possible to determine which of the first or second vertical interconnect resources or which of the first or second rows contains the defect.

According to some embodiments disclosed herein, all of the vertical interconnect resources in a programmable IC have deterministic horizontal fanouts. A vertical interconnect resource has a deterministic horizontal fanout so that a defect in that vertical interconnect resource creates a uniquely identifiable failing row signature relative to the other vertical interconnect resources in the IC that drive signals in the same direction and that originate in different rows or that are different vertical interconnect resource types. The vertical interconnect resources that drive signals in the same direction are grouped together. The vertical interconnect resources in each group are tested together, but are tested separately from the vertical interconnect resources in the other groups. For example, the up driving vertical interconnect resources in the IC are tested separately from the down driving vertical interconnect resources in the IC. During each phase of a test, test vectors are scanned into source registers, driven from the source registers to sink registers via the vertical interconnect resources, and then output values are scanned out of the sink registers. The vertical interconnect resources having defects can be correctly identified and repaired, because the vertical interconnect resources have uniquely identifiable failing row signatures. Therefore, if the sink registers in all of the rows of circuit blocks driven by a vertical interconnect resource capture incorrect values during the test, then the row from which that vertical interconnect resource originates can be correctly identified and repaired.

Also, in a previously known test procedure disclosed in U.S. Pat. No. 7,409,669, horizontal interconnect resources in a programmable IC are tested using one test configuration, and the vertical interconnect resources in the IC are tested using a separate test configuration, which increased the test pattern count.

According to other embodiments disclosed herein, a router creates test routes in a single test configuration to test the vertical and the horizontal interconnect resources in a programmable IC. The test routes may route each vertical interconnect resource in the IC to at least one horizontal interconnect resource in each row of circuit blocks that the vertical interconnect resource fans out to. Each sink register in the test configuration receives sink signals from horizontal interconnect resources and/or vertical interconnect resources that route signals in only one of two different directions (e.g., up or down). During each phase of the test, each test route has only one unmasked vertical interconnect resource that has not been previously tested.

FIG. 1 illustrates vertical interconnect resources that have deterministic horizontal fanouts in a portion 100 of a programmable integrated circuit (IC), according to an embodiment. The portion 100 of the programmable IC includes 17 rows of circuit blocks that are numbered consecutively as rows R to R+16 in Figure (FIG. 1. The entire programmable IC may have many more than 17 rows of circuit blocks. The rows of circuit blocks shown in FIG. 1 may be, for example, in one sector of the IC, and the IC may have several sectors. The circuit blocks in each row may include blocks of programmable logic circuits, blocks of digital signal processing (DSP) circuits, and/or blocks of memory circuits, to name a few examples. As a more specific example, each row may include several logic array blocks, and each of the logic array blocks may include several programmable logic circuits (e.g., logic elements or adaptive logic modules). Each of the programmable logic circuits may, for example, include one or more register circuits and one or more lookup table (LUT) circuits. Each of the DSP circuits may include, for example, one or more register circuits and DSP logic. Each of the memory circuits may include, for example, one or more register circuits and random access memory (RAM) or read only memory (ROM) circuits.

In the example of FIG. 1, the programmable IC has three different vertical interconnect resource types that span different numbers of rows. The first vertical interconnect resource type (referred to herein as V2) drives signals to circuit blocks in the two adjacent rows of circuit blocks that it reaches to. The second vertical interconnect resource type (referred to herein as V4) drives signals to circuit blocks in the four adjacent rows of circuit blocks that it reaches to. The third vertical interconnect resource type (referred to herein as V16) drives signals to circuit blocks in the $8^{th}$, $12^{th}$, and $16^{th}$ rows of circuit blocks that it reaches to. Each of the V2, V4, and V16 vertical interconnect resource types may drive signals in one of two different directions. The two different directions are up and down in the example of FIG. 1.

FIG. 1 shows some exemplary vertical interconnect resources that include multiplexer (MUX) circuits 101-108 and conductors coupled thereto. FIG. 1 also shows some exemplary circuit blocks (CB) 11-12, 21-24, 31-33, 41-42, 51-52, 61-64, 71-73, and 81-82. Each of the circuit blocks in the programmable IC contains at least one register that can store a value during a test.

The vertical and horizontal interconnect resources disclosed herein may include, for example, one or more multiplexer circuits, one or more register circuits (e.g., hyper-registers located within the routing fabric), and conductors. A first example of a down driving V2 vertical interconnect resource includes multiplexer circuit 101 in row R and the conductors coupled between the output of multiplexer circuit 101 and the inputs of circuit blocks 11-12 in rows R+1 and R+2, respectively. A second example of a down driving V2 vertical interconnect resource includes multiplexer circuit 104 in row R+4 and the conductors coupled between the output of multiplexer circuit 104 and the inputs of circuit blocks 41-42 in rows R+5 and R+6, respectively. A first example of an up driving V2 vertical interconnect resource includes multiplexer circuit 105 in row R+12 and the conductors coupled between the output of multiplexer circuit 105 and the inputs of circuit blocks 81-82 in rows R+10 and R+11, respectively. A second example of an up driving V2 vertical interconnect resource includes multiplexer circuit 106 in row R+16 and the conductors coupled between the output of multiplexer circuit 106 and the inputs of circuit blocks 51-52 in rows R+14 and R+15, respectively.

An example of a down driving V4 vertical interconnect resource includes multiplexer circuit 102 in row R and the conductors coupled between the output of multiplexer circuit 102 and the inputs of circuit blocks 21-24 in rows R+1, R+2, R+3, and R+4, respectively. An example of an up driving V4 vertical interconnect resource includes multiplexer circuit 107 in row R+16 and the conductors coupled between the output of multiplexer circuit 107 and the inputs of circuit blocks 61-64 in rows R+12, R+13, R+14, and R+15, respectively. An example of a down driving V16 vertical interconnect resource includes multiplexer circuit 103 in row R and the conductors coupled between the output of multiplexer circuit 103 and the inputs of circuit blocks 31-33 in rows R+8, R+12, and R+16, respectively. An example of an up driving V16 vertical interconnect resource includes multiplexer circuit 108 in row R+16 and the conductors coupled between the output of multiplexer circuit 108 and the inputs of circuit blocks 71-73 in rows R, R+4, and R+8, respectively.

In some embodiments, the programmable IC has one or more V2 vertical interconnect resources, one or more V4 vertical interconnect resources, and one or more V16 vertical interconnect resources originating in each row of circuit blocks. A vertical interconnect resource originates in a row of circuit blocks if the vertical interconnect resource receives an input signal at a driving circuit in that row (e.g., at the input of one of the multiplexer circuits in FIG. 1). The input signal is driven to the driving circuit from a source register. In these embodiments, at least one V2 vertical interconnect resource, at least one V4 vertical interconnect resource, and at least one V16 vertical interconnect resource originates in each of the 17 rows of circuit blocks shown in FIG. 1.

Some of the rows of circuit blocks in an IC may have up driving and down driving vertical interconnect resources. Some rows of circuit blocks may have only up driving vertical interconnect resources or only down driving vertical interconnect resources. Some rows of circuit blocks may have vertical interconnect resources of each vertical interconnect resource type. Some rows of circuit blocks may have vertical interconnect resources of only a subset of the vertical interconnect resource types.

According to some embodiments, a single test configuration of the programmable interconnect resources of a programmable IC is used to implement test routes for the down driving vertical interconnect resources, the up driving vertical interconnect resources, and the horizontal interconnect resources in the IC. A router generates a single test configuration by configuring the programmable interconnect resources of the IC to create test routes. Each test route includes at least one interconnect resource, a circuit block containing a source register, and a circuit block containing a sink register. The test routes are used to test the down driving vertical interconnect resources, the up driving vertical interconnect resources, and the horizontal interconnect resources in the IC. Using a single test configuration of the programmable interconnect resources to test all of the vertical and horizontal interconnect resources in the IC reduces the time it takes to perform tests of the programmable interconnect resources.

The horizontal interconnect resources in a programmable IC may be tested together with the vertical interconnect resources using the same test configuration of the programmable interconnect resources. The single test configuration of the programmable interconnect resources implements test routes through the vertical and horizontal interconnect resources.

In some embodiments, each test route in the test configuration routes through a vertical interconnect resource to at least one horizontal interconnect resource in each row of the circuit blocks that the vertical interconnect resource fans out to. An example of these embodiments is disclosed herein with respect to FIG. 3. These embodiments reduce the time to test the programmable interconnect resources, because the horizontal interconnect resources do not need to be tested separately from the vertical interconnect resources.

In some embodiments, the down driving vertical interconnect resources in the programmable IC are tested separately from the up driving vertical interconnect resources in the IC using the same test configuration of the programmable interconnect resources. The test routes in the test configuration are grouped into configuration patterns. All of the test routes in a configuration pattern can be tested in one phase of a test. The test routes in the test configuration that contain the down driving vertical interconnect resources in the programmable IC are grouped into a first configuration pattern, and the test routes in the test configuration that contain the up driving vertical interconnect resources in the IC are grouped into a second configuration pattern. The down driving vertical interconnect resources in the first configuration pattern are tested during a first phase of a test, and the up driving vertical interconnect resources in the second configuration pattern are tested during a second phase of the test. None of the test routes in the test configuration of the programmable interconnect resources in the IC contain both up driving and down driving vertical interconnect resources in the same test route. Thus, each test route in the test configuration contains either at least one down driving vertical interconnect resource or at least one up driving vertical interconnect resource.

The first configuration pattern is used to test all of the vertical interconnect resources of a first type in the IC and a first subset of the horizontal interconnect resources in the IC. In the first configuration pattern, all of the sink registers that receive signals via test routes of the other vertical interconnect resource types are masked-off. Only the sink registers receiving signals through test routes that include the first type of vertical interconnect resources and/or horizontal interconnect resources are tested using the first configuration pattern. At the end of the execution of the first configuration pattern, the values stored in the sink registers are collected and then compared to expected values stored in a failing row signature lookup table to determine which rows of circuit blocks stored incorrect values.

The second configuration pattern is used to test all of the vertical interconnect resources of a second type in the IC and a second subset of the horizontal interconnect resources in the IC. In the second configuration pattern, all of the sink registers that receive signals via test routes with the other vertical interconnect resource types are masked-off. Only the sink registers receiving signals through test routes that include the second type of vertical interconnect resources and/or horizontal interconnect resources are tested using the second configuration pattern. At the end of the execution of the second configuration pattern, the values stored in the sink registers are collected and then compared to expected values stored in the failing row signature lookup table to determine which rows of circuit blocks stored incorrect values. This procedure is repeated until all of the vertical interconnect resource types in the IC are tested.

According to some embodiments, all of the vertical interconnect resources in a programmable IC have deterministic horizontal fanouts, such that a defect in each vertical interconnect resource creates a uniquely identifiable failing row signature during a test relative to the other vertical interconnect resources in the IC that drive signals in the same direction and that originate in different rows of circuit blocks or that are different vertical interconnect resource types. A defect in a vertical interconnect resource propagates incorrect values to sink registers in all of the circuit blocks that the vertical interconnect resource fans out to. Thus, a defect in a down driving vertical interconnect resource creates a unique failing signature for the row it originates in relative to the down driving vertical interconnect resources originating in other rows in terms of which rows store incorrect values during a test. Because a defect in each down driving vertical interconnect resource creates a unique failing signature for a failed row, the row of circuit blocks containing the defect can be positively identified. A defect in an up driving vertical interconnect resource creates a unique failing signature for the row it originates in relative to the up driving vertical interconnect resources originating in other rows in terms of which rows store incorrect values during a test. Because a defect in each up driving vertical interconnect resource creates a unique failing signature for a failed row, the row of circuit blocks containing the defect can be positively identified.

The unique failing signatures for the down driving V2, V4, and V16 vertical interconnect resources of FIG. 1 are the number of and the location of the rows of circuit blocks that capture incorrect values during a test of the down driving vertical interconnect resources as now described. A defect in a down driving V2 vertical interconnect resource causes incorrect values to be captured in the two rows below the row in which the V2 vertical interconnect resource originates. A defect in a down driving V4 vertical interconnect resource causes incorrect values to be captured in the four rows below the row in which the V4 vertical interconnect resource originates. A defect in a down driving V16 vertical interconnect resource causes incorrect values to be captured in the $8^{th}$, $12^{th}$, and $16^{th}$ rows below the row in which the V16 vertical interconnect resource originates. As a result, a row containing a defect can be positively identified based on which rows store incorrect values during a test of the down driving vertical interconnect resources.

The V2, V4, and V16 down driving vertical interconnect resources that originate in different rows cause circuit blocks in different sets of rows to store incorrect values. As a result, during a test of the down driving vertical interconnect resources in the IC, a row of circuit blocks containing a defect can be identified based on which unique set of rows of circuit blocks stores incorrect values. Incorrect values can be determined by comparing the values read from sink registers in the circuit blocks during a test to predetermined expected values that are stored, e.g., in a failing row signature lookup table.

For example, a defect in the down driving V2 vertical interconnect resource originating in row R at multiplexer circuit 101 causes circuit blocks 11-12 in rows R+1 and R+2 to store incorrect values during a test of the vertical interconnect resources. A defect in a down driving V2 vertical interconnect resource originating in row R+1 causes circuit blocks in rows R+2 and R+3 to store incorrect values during the test. A defect in a down driving V2 vertical interconnect resource originating in row R+2 causes sink registers in rows R+3 and R+4 to store incorrect values. A defect in the down driving V4 vertical interconnect resource originating in row R at multiplexer circuit 102 causes circuit blocks 21-24 in rows R+1, R+2, R+3, and R+4 to store incorrect values during the test. A defect in a down driving V4 vertical interconnect resource originating in row R+1 causes sink registers in rows R+2, R+3, R+4, and R+5 to store incorrect values.

The unique failing signatures for the up driving V2, V4, and V16 vertical interconnect resources of FIG. 1 are the number of and the location of the rows of circuit blocks that capture incorrect values during a test of the up driving vertical interconnect resources as now described. A defect in an up driving V2 vertical interconnect resource causes incorrect values to be captured in the two rows above the row in which the V2 vertical interconnect resource originates. A defect in an up driving V4 vertical interconnect resource causes incorrect values to be captured in the four rows above the row in which the V4 vertical interconnect resource originates. A defect in an up driving V16 vertical interconnect resource causes incorrect values to be captured in the $8^{th}$, $12^{th}$, and $16^{th}$ rows above the row in which the V16 vertical interconnect resource originates. As a result, a row containing a defect can be positively identified based on which rows store incorrect values during a test of the up driving vertical interconnect resources.

The V2, V4, and V16 up driving vertical interconnect resources that originate in different rows cause circuit blocks in different sets of rows to store incorrect values. As a result, during a test of the up driving vertical interconnect resources in the IC, a row of circuit blocks containing a defect can be identified based on which unique set of rows of circuit blocks stores incorrect values. For example, a defect in the up driving V2 vertical interconnect resource originating in row R+16 at multiplexer 106 causes circuit blocks 51-52 in rows R+14 and R+15 to store incorrect values. A defect in an up driving V2 vertical interconnect resource originating in row R+15 causes circuit blocks in rows R+13 and R+14 to store incorrect values. A defect in the up driving V4 vertical interconnect resource originating in row R+16 at multiplexer 107 causes circuit blocks 61-64 in rows R+12, R+13, R+14, and R+15 to store incorrect values.

An assumption may be made that there is at most a single defect affecting the programmable interconnect resources during each phase of a test. Single defect assumption is a standard practice in the field of test generation. If it is assumed that the IC has at most a single defect affecting the programmable interconnect resources tested in each phase of a test, then it can be assumed that the down driving vertical interconnect resources originating in each row have a unique failing signature in terms of which rows of circuit blocks store incorrect values during the first phase of the test. As an example, if the down driving V2 vertical interconnect resources originating in rows R and R+2 both have defects, the results of the test showing incorrect values stored in rows R+1 through R+4 would be the same as a defect in the down driving V4 vertical interconnect resource originating in row R. In this example, it can be assumed that a single defect exists in the down driving V4 vertical interconnect resource originating in row R, rather than two defects in the down driving V2 vertical interconnect resources originating in rows R and R+2. If it is assumed that the IC has at most a single defect affecting the programmable interconnect resources in each phase of a test, then it can be assumed that the up driving vertical interconnect resources originating in each row have a unique failing signature in terms of which rows of circuit blocks store incorrect values during the second phase of the test.

Figure 2:
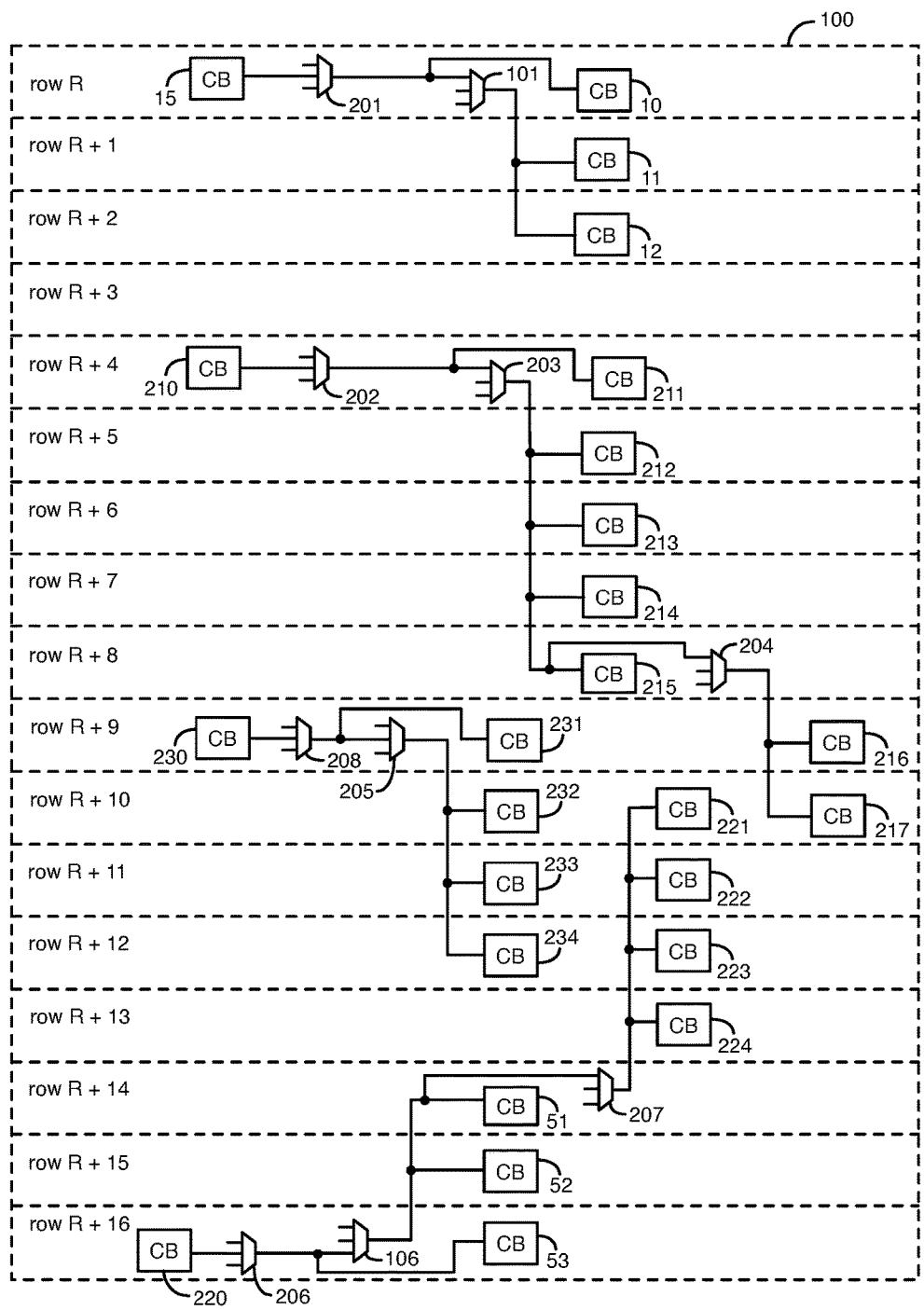
FIG. 2 illustrates exemplary vertical and horizontal interconnect resources connected in test routes in a portion of a programmable integrated circuit (IC), according to an embodiment.

FIG. 2 illustrates exemplary vertical and horizontal interconnect resources connected in test routes in the portion 100 of the programmable integrated circuit (IC), according to an embodiment. In the embodiment of FIG. 2, the portion 100 of the programmable IC includes circuit blocks (CB) 10-12, 15, 51-53, 210-217, 220-224, and 230-234. The portion 100 of the IC also includes multiplexer circuits 101, 106, and 201-208. The portion 100 of the IC and the remainder of the IC may include numerous additional circuit blocks arranged in rows and numerous additional multiplexer circuits that are part of the vertical and horizontal interconnect resources.

In the embodiment of FIG. 2, circuit blocks 15, 210, 220, and 230 contain registers that function as source registers during a test of the programmable interconnect resources. Each of the test routes shown in FIG. 2 includes a vertical interconnect resource and a horizontal interconnect resource that connects to the vertical interconnect resource in the row in which the vertical interconnect resource originates. Each of the horizontal interconnect resources routes a signal within the same row.

For example, a source register in circuit block 15 provides a source signal to an input of multiplexer circuit 201 during the test. Multiplexer circuit 201 is configured during the test to provide the source signal from circuit block 15 to inputs of circuit block 10 in row R and multiplexer circuit 101. Multiplexer circuit 201 is part of a horizontal interconnect resource in row R that routes signals within row R. Multiplexer circuit 101 provides the source signal to inputs of circuit blocks 11-12.

According to some embodiments, a test route in a test configuration of the programmable IC may have two or more vertical interconnect resources. A test route that contains two vertical interconnect resources may not have a unique failing row signature if the entire test route is tested at the same time. For example, a test route that connects together two V2 down driving vertical interconnect resources originating in rows R and R+2 may have the same failing row signature as a V4 down driving vertical interconnect resource originating in row R. Therefore, each of the vertical interconnect resources within a single test route is tested during a separate phase of the test of the programmable interconnect resources. During each of multiple phases of the test, only one vertical interconnect resource in each test route is tested. All of the sink registers that receive signals from any of the other untested vertical interconnect resources within each test route are masked-off during the respective phase of the test. At the start of each phase of the test, only one vertical interconnect resource within the unmasked portion of each test route has not been tested yet. Examples of test routes that each has two vertical interconnect resources are shown in FIG. 2.

FIG. 2 shows an example of a test route that includes two down driving vertical interconnect resources. This test route includes multiplexer circuits 202-204. Multiplexer circuit 202 is part of a horizontal interconnect resource in row R+4. Multiplexer circuit 203 is part of a V4 down driving vertical interconnect resource in row R+4. Multiplexer circuit 204 is part of a V2 down driving vertical interconnect resource in row R+8. The V2 and V4 resources in this test route are tested in separate phases. A source register in circuit block 210 provides a source signal to an input of multiplexer circuit 202 during the test. Multiplexer circuit 202 is configured during the test to provide the source signal from circuit block 210 to inputs of multiplexer circuit 203 and circuit block 211 in row R+4. Multiplexer circuit 203 provides the source signal to inputs of circuit blocks 212-215 and multiplexer circuit 204. Multiplexer circuit 204 provides the source signal from multiplexer circuit 203 to inputs of circuit blocks 216-217. The sink registers in circuit blocks 216-217 are masked-off during one phase of the test to create a unique failing row signature for the V4 vertical interconnect resource. During a subsequent phase of the test, the sink registers in circuit blocks 216-217 are unmasked so that they can store test values received through the test route.

FIG. 2 also shows a test route that includes two up driving vertical interconnect resources. This test route includes multiplexer circuits 106 and 206-207. Multiplexer circuit 206 is part of a horizontal interconnect resource in row R+16. Multiplexer circuit 207 is part of a V4 up driving vertical interconnect resource in row R+14. The V2 and V4 resources in this test route are tested in separate phases. A source register in circuit block 220 provides a source signal to an input of multiplexer circuit 206 during the test. Multiplexer circuit 206 is configured during the test to provide the source signal from circuit block 220 to inputs of multiplexer circuit 106 and circuit block 53 in row R+16. Multiplexer circuit 106 provides the source signal to inputs of circuit blocks 51-52 and multiplexer circuit 207. Multiplexer circuit 207 provides the source signal from multiplexer circuit 106 to inputs of circuit blocks 221-224. The sink registers in circuit blocks 221-224 are masked-off during one phase of the test to create a unique failing row signature for the V2 vertical interconnect resource that includes multiplexer circuit 106. During a subsequent phase of the test, the sink registers in circuit blocks 221-224 are unmasked so that they can store test values received through the test route.

The rows of circuit blocks that stored incorrect values during a test are referred to as failing rows. Table 1 below shows examples of failing row signatures for horizontal and down driving vertical interconnect resources in rows of circuit blocks in an IC. N is a non-zero positive integer, and row N in Table 1 may be any of the rows of circuit blocks in the IC. Each of the failing row signatures shown in the first column of Table 1 indicates a defect in row N.

TABLE 1

| Failing Rows | Failed Resource | Row to be Repaired |
| --- | --- | --- |
| N | Horizontal in Row N | N |
| N + 1 and N + 2 | V2 MUX in Row N | N |
| N, N + 1, and N + 2 | Horizontal in Row N driving V2 | N |
| N + 1, N + 2, N + 3, and N + 4 | V4 MUX in Row N | N |
| N, N +1, N + 2, N + 3, and N + 4 | Horizontal in Row N driving V4 | N |
| N + 8, N + 12, and N + 16 | V16 MUX in Row N | N |

Table 2 below shows examples of failing row signatures for horizontal and up driving vertical interconnect resources in rows of circuit blocks in an IC. Row N in Table 2 may be any of the rows of circuit blocks in the IC. Each of the failing row signatures shown in the first column of Table 2 indicates a defect in row N. The row N containing the defect may be repaired by any suitable repair technique, for example, by replacing row N with a redundant row.

TABLE 2

| Failing Rows | Failed Resource | Row to be Repaired |
| --- | --- | --- |
| N | Horizontal in Row N | N |
| N − 1 and N − 2 | V2 MUX in Row N | N |
| N, N − 1, and N − 2 | Horizontal in Row N driving V2 | N |
| N − 1, N − 2, N − 3, and N − 4 | V4 MUX in Row N | N |
| N, N − 1, N − 2, N − 3, and N − 4 | Horizontal in Row N driving V4 | N |
| N − 8, N − 12, and N − 16 | V16 MUX in Row N | N |

According to some embodiments, a programmable IC may have a vertical interconnect resource type that drives signals to circuit blocks in the three adjacent rows of circuit blocks that the vertical interconnect resource reaches to (referred to herein as a V3 vertical interconnect resource). V3 vertical interconnect resources include up driving and down driving vertical interconnect resources. FIG. 2 shows an example of a V3 down driving vertical interconnect resource that includes multiplexer circuit 205 in row R+9 and conductors coupled thereto in rows R+9, R+10, R+11, and R+12. A source register in circuit block 230 provides a source signal to an input of multiplexer circuit 208 during the test. Multiplexer circuit 208 is part of a horizontal interconnect resource. Multiplexer circuit 208 is configured during the test to provide the source signal from circuit block 230 to inputs of multiplexer circuit 205 and circuit block 231 in row R+9. Multiplexer circuit 205 is configured to provide the source signal from multiplexer circuit 208 to inputs of circuit blocks 232-234.

If multiplexer circuit 208 contains a defect, it may cause 4 adjacent rows of circuit blocks to capture incorrect values during a test via multiplexer circuit 205. Thus, a horizontal interconnect resource coupled to a down driving V3 vertical interconnect resource may generate the same failing row signature as a down driving V4 vertical interconnect resource originating in the same row, as shown for example in row 5 of Table 1. A horizontal interconnect resource coupled to an up driving V3 vertical interconnect resource may generate the same failing row signature as an up driving V4 vertical interconnect resource originating in the same row, as shown for example in row 5 of Table 2. Therefore, V3 vertical interconnect resources in a programmable IC can be tested during different phases of a test than the phases of the test used to test the V2 and V4 vertical interconnect resources to preserve the unique failing row signatures. The same test configuration of the programmable interconnect resources in the IC can be used to test the V2, V3, V4, and V16 vertical interconnect resources. The V16 vertical interconnect resources may be tested concurrently with the V2 and V4 vertical interconnect resources or concurrently with the V3 vertical interconnect resources.

Figure 3:
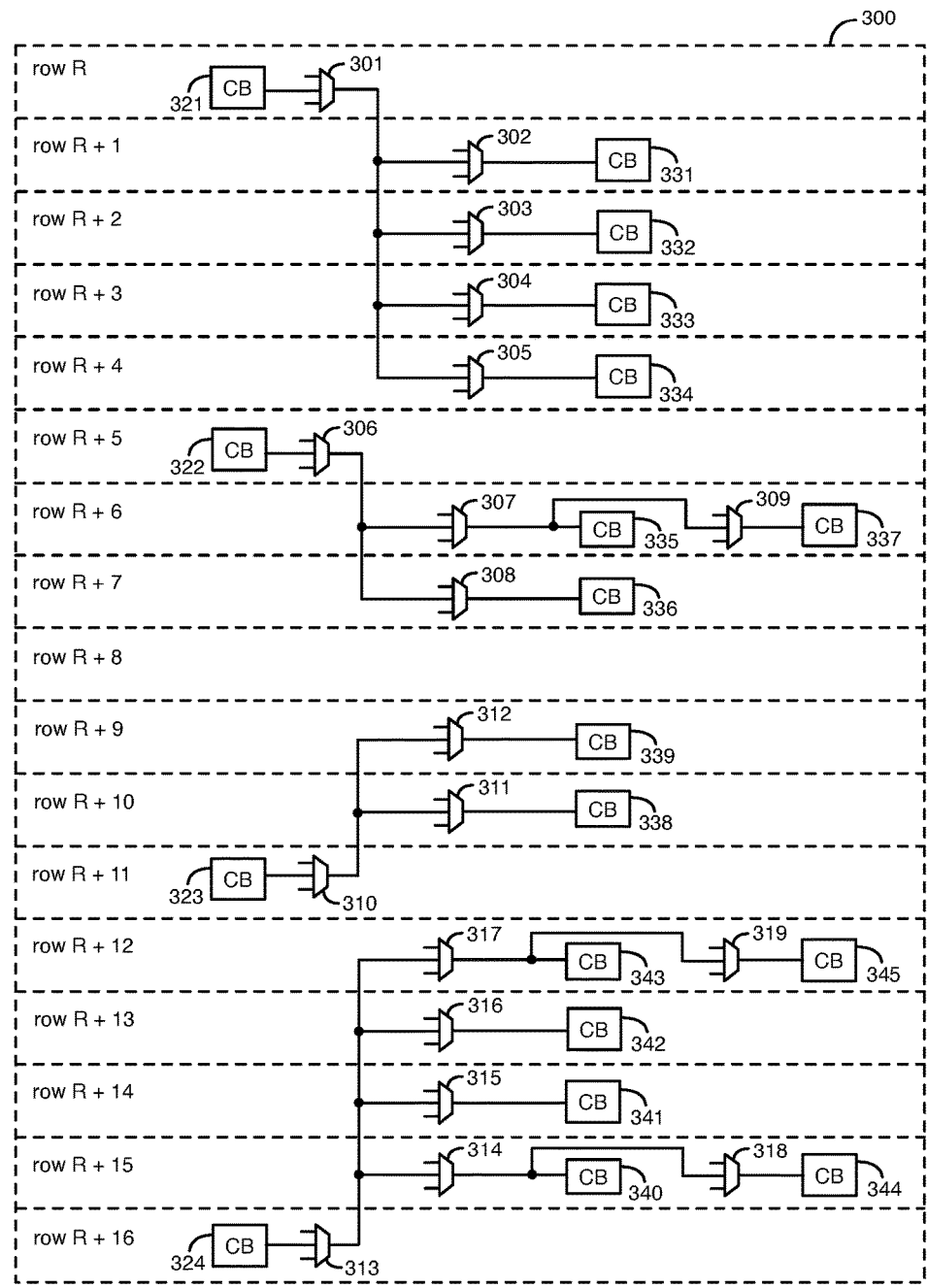
FIG. 3 illustrates additional exemplary vertical and horizontal interconnect resources connected in test routes in a portion of a programmable integrated circuit (IC), according to an embodiment.

FIG. 3 illustrates additional exemplary vertical and horizontal interconnect resources connected in test routes in a portion 300 of a programmable integrated circuit (IC), according to an embodiment. In the embodiment of FIG. 3, portion 300 of the programmable IC includes multiplexer circuits 301-319 and circuit blocks (CB) 321-324 and 331-345. Portion 300 of the programmable IC may be, for example, a subset or a superset of portion 100, or a different non-overlapping portion of the same programmable IC. Alternatively, portion 100 and portion 300 may be in different programmable ICs.

In the embodiment of FIG. 3, each test route in the test configuration routes through a vertical interconnect resource to at least one horizontal interconnect resource in each row of circuit blocks that the vertical interconnect resource fans out to. For example, a source register in circuit block 321 provides a source signal to an input of multiplexer circuit 301 in row R during the test. Multiplexer circuit 301 is configured during the test to provide the source signal from circuit block 321 to inputs of multiplexer circuits 302-305 in rows R+1, R+2, R+3, and R+4, respectively. Multiplexer circuits 302-305 are part of horizontal interconnect resources in their respective rows. Multiplexer circuits 302-305 are configured to provide the source signal to inputs of circuit blocks 331-334 in rows R+1, R+2, R+3, and R+4, respectively.

As another example, a source register in circuit block 322 provides a source signal to an input of multiplexer circuit 306 in row R+5 during the test. Multiplexer circuit 306 is configured during the test to provide the source signal from circuit block 322 to inputs of multiplexer circuits 307-308 in rows R+6 and R+7, respectively. Multiplexer circuits 307-308 are configured to provide the source signal to inputs of circuit blocks 335-336 in rows R+6 and R+7, respectively. The source signal is also provided to an input of circuit block 337 in row R+6 through multiplexer circuits 306-307 and 309. Multiplexer circuits 307-309 are part of horizontal interconnect resources. This example illustrates that a test route in a test configuration may include multiple horizontal interconnect resources (e.g., multiplexer circuits 307 and 309) in the same row.

The embodiment of FIG. 3 includes test routes with up driving and down driving vertical interconnect resources. For example, a source register in circuit block 323 provides a source signal through a V2 up driving vertical interconnect resource that includes multiplexer 310 and through horizontal interconnect resources that include multiplexers 311-312 to inputs of circuit blocks 338-339, respectively.

As another example, a source register in circuit block 324 provides a source signal through a V4 up driving vertical interconnect resource that includes multiplexer 313 and through horizontal interconnect resources that include multiplexers 314-317 to inputs of circuit blocks 340-343, respectively. The source signal is also provided to an input of circuit block 344 through multiplexers 313-314 and 318 and to an input of circuit block 345 through multiplexers 313, 317, and 319. Multiplexer circuits 314-319 are part of horizontal interconnect resources. Thus, this test route includes multiple horizontal interconnect resources (e.g., multiplexers 314/318 and 317/319) in each of rows R+15 and R+12.

Figure 4:
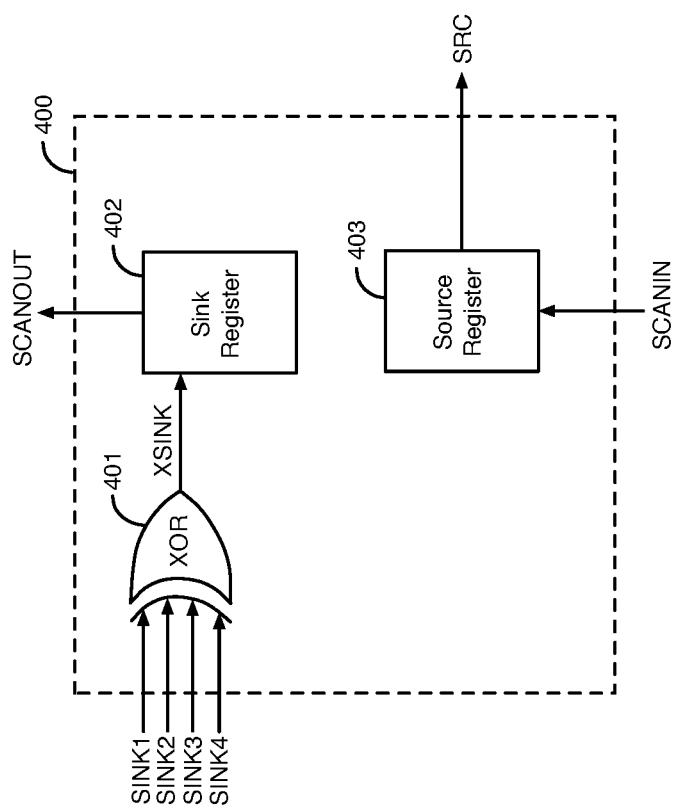
FIG. 4 illustrates an example of a circuit block in a programmable IC, according to an embodiment.

FIG. 4 illustrates an example of a circuit block 400 in a programmable IC, according to an embodiment. The circuitry shown in FIG. 4 in circuit block 400 is an example of circuitry that may be in each of the circuit blocks in a programmable IC, including the circuit blocks shown in and described with respect to FIGS. 1-3. For example, the circuitry shown in circuit block 400 may be in each of source circuit blocks 321-324 and/or in each of sink circuit blocks 331-345 in FIG. 3. Circuit block 400 may be, for example, a programmable logic circuit, a logic array block that contains several programmable logic circuits, a block of one or more memory circuits, or a block of one or more DSP circuits. Circuit block 400 shown in FIG. 4 includes an XOR logic gate circuit 401, a sink register circuit 402, and a source register circuit 403. XOR logic gate circuit 401 may, for example, be built using one or more lookup table circuits in a programmable logic circuit. As another example, XOR logic gate circuit 401 may be built using logic gate circuits such as inverters, AND, OR, and/or NAND logic gates.

In the example shown in FIG. 4, XOR gate circuit 401 receives 4 sink input signals SINK1-SINK4. As other examples, an XOR gate circuit in a circuit block that functions as a sink during a test of the programmable interconnect resources may receive two, three, five, six, seven, or more sink input signals. XOR gate circuit 401 performs an exclusive OR function on its sink input signals SINK1-SINK4 to generate an output signal XSINK. XOR gate circuit 401 performs modulo-2 addition on the logic states of its input signals SINK1-SINK4 to generate the logic state of its output signal XSINK. Thus, XOR gate circuit 401 generates a logic high state (i.e., a 1) in signal XSINK in response to an odd number of logic high states (i.e., 1s) in its input signals SINK1-SINK4. Signal XSINK is provided to an input of sink register circuit 402. Sink register circuit 402 may, for example, include one or more flip-flop circuits.

During a test of the programmable interconnect resources, sink input signals SINK1-SINK4 are provided to inputs of XOR gate circuit 401. The sink input signals SINK1-SINK4 are provided to XOR gate 401 through test routes that have only vertical interconnect resources of a particular type and horizontal interconnect resources. As an example, if one of the sink input signals to XOR gate 401 is from a test route having a down driving vertical interconnect resource, then all of the other sink input signals to that XOR gate 401 are from test routes that have only down driving vertical interconnect resources and/or horizontal interconnect resources.

As another example, if one of the sink input signals to XOR gate 401 is from a test route having an up driving vertical interconnect resource, then all of the other sink input signals to that XOR gate 401 are from test routes that have only up driving vertical interconnect resources and/or horizontal interconnect resources. Any one or more of the sink input signals to XOR gate 401 may be from a test route that has one or more horizontal interconnect resources. XOR gate 401 does not receive sink input signals from test routes having multiple vertical interconnect resource types that route in different directions. For example, XOR gate 401 does not receive one sink input signal from a test route having a down driving vertical interconnect resource and another sink input signal from a test route having an up driving vertical interconnect resource.

In some embodiments, a first subset of the test routes in a test configuration of the programmable interconnect resources in a programmable IC includes the down driving vertical interconnect resources and a first subset of the horizontal interconnect resources. A second subset of the test routes in the test configuration includes the up driving vertical interconnect resources and a second subset of the horizontal interconnect resources. Each of the circuit blocks functioning as sinks in the first subset of the test routes only receives test signals from the first subset of the test routes. Each of the circuit blocks functioning as sinks in the second subset of the test routes only receives test signals from the second subset of the test routes. A constraint imposed on the test configuration prevents the test configuration from including a circuit block that receives signals from both a test route having an up driving vertical interconnect resource and a test route having a down driving vertical interconnect resource. This constraint allows the down driving vertical interconnect resources to be tested separately from the up driving vertical interconnect resources. Another constraint that may be imposed on the test configuration prevents the test configuration from having two test routes that route two test signals from the same source register to the XOR gate 401 in the same circuit block functioning as a sink.

A defect that causes an incorrect value in any of the sink input signals SINK1-SINK4 affects the logic state of the output signal XSINK of XOR gate circuit 401 regardless of the logic states of the other input signals to XOR gate 401. Because an XOR gate 401 is selected to combine the sink input signals SINK1-SINK4 to generate signal XSINK, none of the sink input signals SINK1-SINK4 to XOR gate 401 can block another one of the sink input signals to XOR gate 401 from affecting the output signal XSINK.

During each phase of a test of the programmable interconnect resources, the source registers in the circuit blocks functioning as sources are initially configured as scan chain registers. Test vectors are then shifted into these source registers. For example, a test signal SCANIN that is part of a test vector is shifted into source register 403 in FIG. 4 and stored in source register 403 in source signal SRC. The source signals SRC are then driven from the source registers 403 through the test routes to the XOR gates 401 in the circuit blocks functioning as sinks. The sink registers 402 in the circuit blocks 400 functioning as sinks store the output signals XSINK of their respective XOR gates 401 in signals SCANOUT. The sink registers 402 in the circuit blocks 400 functioning as sinks are then configured as scan chain registers, and the values of the output signals XSINK are shifted out of these sink registers 402 as signals SCANOUT.

Figure 5:
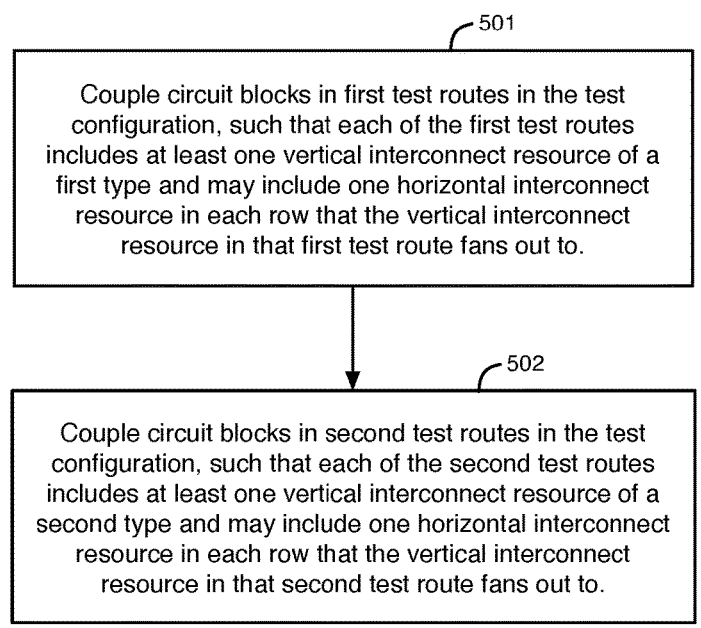
FIG. 5 is a flow chart illustrating examples of operations that can be performed to implement a test of programmable interconnect resources in a programmable IC, according to an embodiment.

FIG. 5 is a flow chart illustrating examples of operations that can be performed to implement a test of programmable interconnect resources in a programmable IC, according to an embodiment. The operations of FIG. 5 may be used to create a test configuration for a programmable IC to test programmable interconnect resources in the programmable IC. In operation 501, circuit blocks are coupled in first test routes in the test configuration. Each of the first test routes has at least one vertical interconnect resource of a first type that fans out to circuit blocks functioning as sinks in at least two rows of circuit blocks. Each of the first test routes may also have one horizontal interconnect resource in each of the rows that the vertical interconnect resource in that first test route fans out to. In operation 502, circuit blocks are coupled in second test routes in the test configuration. Each of the second test routes has at least one vertical interconnect resource of a second type that fans out to circuit blocks functioning as sinks in at least two rows of circuit blocks. Each of the second test routes may also have one horizontal interconnect resource in each of the rows that the vertical interconnect resource in that second test route fans out to. Each of the horizontal interconnect resources creates at least one signal path within at most one row of the circuit blocks. The first and second types of vertical interconnect resources may, for example, be routed in different directions and/or may span a different number of rows. As a specific example, the first and second types of vertical interconnect resources may be up driving and down driving vertical interconnect resources, respectively. As another specific example, the first type of vertical interconnect resources may span a first number of rows, and the second type of vertical interconnect resources may span a second number of rows, where the second number is different than the first number.

Figure 6:
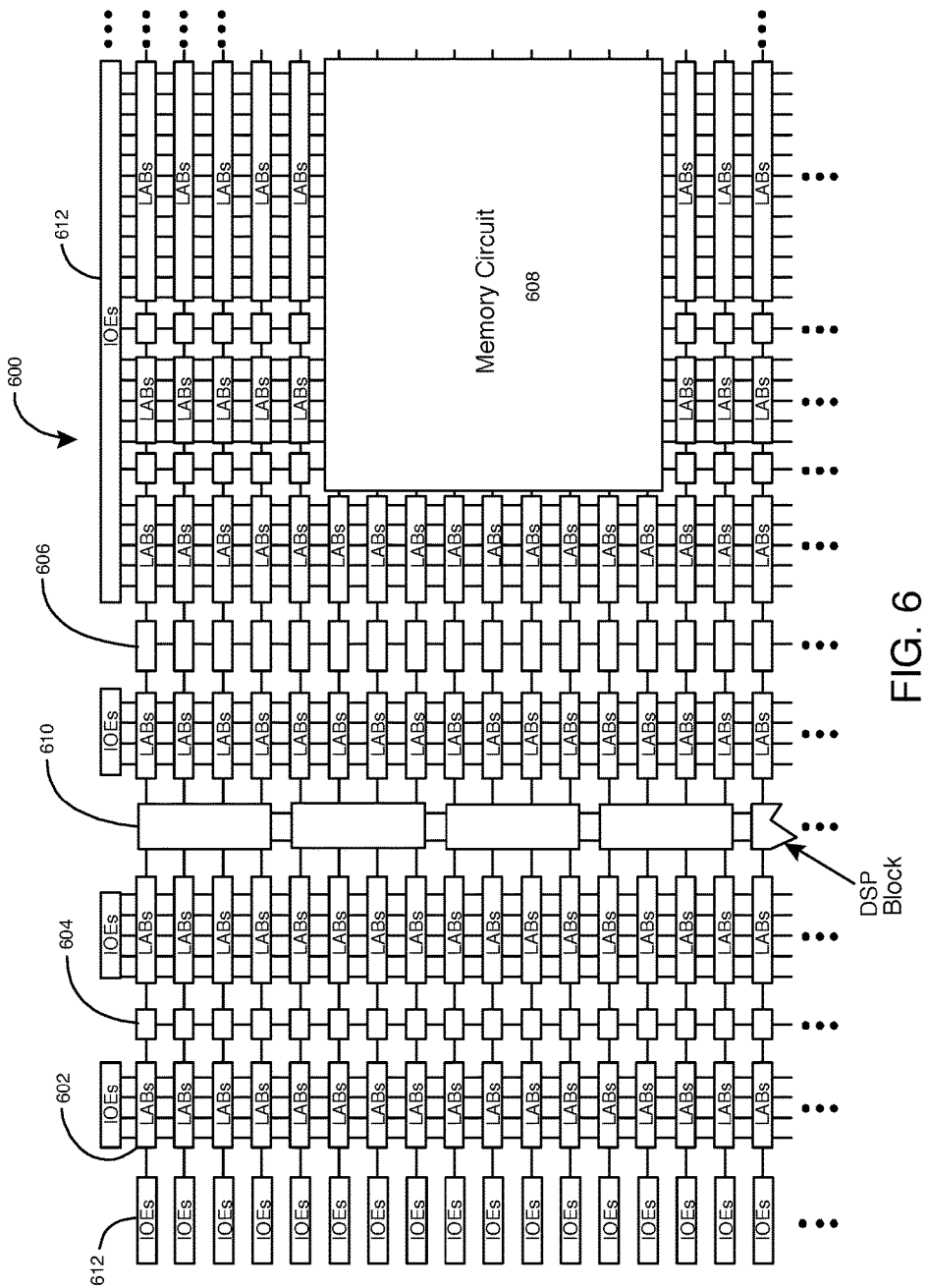
FIG. 6 is a simplified partial block diagram of a field programmable gate array (FPGA) that can include embodiments of the present invention.

FIG. 6 is a simplified partial block diagram of a field programmable gate array (FPGA) 600 that can include embodiments of the present invention. FPGA 600 is merely one example of an integrated circuit that can include features of the present invention. Embodiments of the present invention can be used in numerous types of integrated circuits, such as field programmable gate arrays (FPGAs), programmable logic devices (PLDs), complex programmable logic devices (CPLDs), programmable logic arrays (PLAs), and other types of integrated circuits having programmable interconnect resources.

FPGA 600 includes a two-dimensional array of programmable logic array blocks (or LABs) 602 that are interconnected by a network of vertical and horizontal interconnect resources of varying length and speed. Each of LABs 602 includes multiple (e.g., 10) logic elements (or LEs).

A logic element (LE) is a programmable logic circuit that provides for efficient implementation of user defined logic functions. An FPGA has numerous logic elements that can be configured to implement various combinatorial and sequential functions. The logic elements have access to the programmable interconnect resources. The programmable interconnect resources can be programmed to interconnect the logic elements in almost any desired configuration.

FPGA 600 may also include a distributed memory structure including random access memory (RAM) circuits of varying sizes provided throughout the array. The RAM circuits include, for example, circuits 604, circuits 606, and circuit 608. These memory circuits can also include shift registers and first-in first-out (FIFO) circuits.

FPGA 600 may further include digital signal processing (DSP) circuits 610 that can implement, for example, multipliers with add or subtract features. Input/output elements (IOEs) 612 located, in this example, around the periphery of the IC, support numerous single-ended and differential input/output standards. IOEs 612 are coupled to pads. Each of the pads is an external terminal of the FPGA.

The integrated circuits described herein may be part of a data processing system that includes one or more of the following components; a processor; memory; input/output circuitry; and peripheral devices. The integrated circuits can be used in a wide variety of applications, such as computer networking, data networking, instrumentation, video processing, digital signal processing, or any suitable other application.

Although the method operations were described in a specific order, it should be understood that other operations may be performed in between described operations, described operations may be adjusted so that they occur at slightly different times or in a different order, or described operations may be distributed in a system that allows the occurrence of the processing operations at various intervals associated with the processing.

The foregoing description of the exemplary embodiments of the present invention is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A programmable integrated circuit comprising:
   rows of circuit blocks;
   up driving vertical interconnect resources that each comprises a programmable signal path coupled to at least two of the rows of circuit blocks, and wherein a defect in any one of the up driving vertical interconnect resources in the programmable integrated circuit causes circuit blocks in a different set of the rows to store incorrect values compared to defects in the up driving vertical interconnect resources that originate in different ones of the rows of circuit blocks; and
   down driving vertical interconnect resources that each comprises a programmable signal path coupled to at least two of the rows of circuit blocks, and wherein a defect in any one of the down driving vertical interconnect resources in the programmable integrated circuit causes circuit blocks in a different set of the rows to store incorrect values compared to defects in the down driving vertical interconnect resources that originate in different ones of the rows of circuit blocks.

2. The programmable integrated circuit of claim 1, wherein a defect in any one of the up driving vertical interconnect resources generates a unique failing row signature that allows a failing row of circuit blocks having the defect to be identified and replaced with a redundant row, and wherein a defect in any one of the down driving vertical interconnect resources generates a unique failing row signature that allows a failing row of circuit blocks having the defect to be identified and replaced with a redundant row.

3. The programmable integrated circuit of claim 1, wherein the up driving vertical interconnect resources route signals between the rows of circuit blocks in a first direction, and wherein the down driving vertical interconnect resources route signals between the rows of circuit blocks in a second direction that is opposite the first direction.

4. The programmable integrated circuit of claim 1, wherein a first one of the up driving vertical interconnect resources comprises a programmable signal path coupled to two adjacent ones of the rows of circuit blocks, wherein a second one of the up driving vertical interconnect resources comprises a programmable signal path coupled to four adjacent ones of the rows of circuit blocks, and wherein a third one of the up driving vertical interconnect resources comprises a programmable signal path coupled to three of the rows of circuit blocks that are not next to each other.

5. The programmable integrated circuit of claim 4, wherein a first one of the down driving vertical interconnect resources comprises a programmable signal path coupled to two adjacent ones of the rows of circuit blocks, wherein a second one of the down driving vertical interconnect resources comprises a programmable signal path coupled to four adjacent ones of the rows of circuit blocks, and wherein a third one of the down driving vertical interconnect resources comprises a programmable signal path coupled to three of the rows of circuit blocks that are not next to each other.

6. The programmable integrated circuit of claim 1, wherein each of the up driving vertical interconnect resources and each of the down driving vertical interconnect resources comprises a multiplexer circuit in one of the rows of circuit blocks that is programmable to drive a signal to adjacent ones of the rows of circuit blocks.

7. The programmable integrated circuit of claim 1, wherein the circuit blocks in the rows of circuit blocks comprise programmable logic circuits.

8. The programmable integrated circuit of claim 7, wherein the circuit blocks in the rows of circuit blocks further comprise digital signal processing circuits and memory circuits.

* * * * *